July 4, 1972   O. A. W. TICHY   3,674,419
SPIN CONTROL FOR A WASHER-DRYER
Filed Nov. 25, 1970   2 Sheets-Sheet 1

INVENTOR.
Oscar A. W. Tichy
BY _____ ATTORNEYS

|  | Q1 | Q̄1 | Q2 | Q̄2 | Q3 | Q̄3 | G1 | G2 | G3 | G4 | TD |
|---|---|---|---|---|---|---|---|---|---|---|---|
| START | 0 | 1 | 0 | 1 | 0 | 1 | 1 | 0 | 1 | 0 | 1 |
| TUMBLE | 0 | 1 | 0 | 1 | 0 | 1 | 1 | 1 | 1 | 0 | 1 |
| SPIN | 1 | 0 | 0 | 1 | 0 | 1 | 1 | 1 | 0 | 1 | 1 |
| BRAKE | 1 | 0 | 0 | 0 | 0 | 1 | 1 | 1 | 1 | 1 | 1 |
| ZERO | 0 | 1 | 0 | 1 | 1 | 0 | 1 | 0 | 1 | 0 | 1 |
| RE-TUMBLE | 0 | 1 | 0 | 1 | 1 | 0 | 1 | 1 | 1 | 0 | 1 |
| RE-SPIN | 1 | 0 | 0 | 1 | 0 | 1 | 1 | 1 | 0 | 1 | 0 |
| HOLD-SPIN | 1 | 0 | 0 | 1 | 0 | 1 | 1 | 0 | 1 | 1 | 1 |

INVENTOR.
Oscar A. W. Tichy

ATTORNEYS

United States Patent Office 3,674,419
Patented July 4, 1972

3,674,419
SPIN CONTROL FOR A WASHER-DRYER
Oscar A. W. Tichy, St. Joseph, Mich., assignor to Whirlpool Corporation, Benton Harbor, Mich.
Filed Nov. 25, 1970, Ser. No. 92,716
Int. Cl. D06f *33/02, 37/36*
U.S. Cl. 8—158
13 Claims

ABSTRACT OF THE DISCLOSURE

An automatic combination washer-dryer includes a spin control computer which is responsive to simple digital input signals indicative of drum speed and drum unbalance to effect repeated retumbling operation for laundry redistribution in response to a predetermined drum unbalance at speeds below a predetermined speed.

BACKGROUND OF THE INVENTION

(1) Field of the invention

This invention relates to a control circuit for a laundry appliance, and more particularly to a spin control which provides for automatic laundry redistribution in response to a predetermined drum unbalance below a predetermined drum speed.

(2) Description of the prior art

The redistribution of laundry in response to the detection of an unbalance condition of a spinning drum is known in the art. For example, one system includes an unbalance sensing switch which initiates a timed tumbling interval under the control of a program timer mechanism to redistribute the laundry. Another system employs a computer which operates on an analog basis in response to voltages which are proportional to speed and unbalance.

The utilization of the timed redistribution interval presupposes that the laundry will be satisfactorily distributed at the end of such interval, while the operation of a spin control system on an analog basis requires signal amplification and possibly signal shaping.

SUMMARY OF THE INVENTION

According to the invention, a spin control circuit is effective to provide repeated attempts to rotate the drum at a speed whereby water may be centrifugally extracted from the laundry. The control circuit is provided with a plurality of sensed inputs which are conditioned to provide simple digital signals representing particular levels of speed and unbalance of the drum. In each instance of a predetermined unbalance condition below a predetermined drum speed, the control circuit effects a stopping of the drum and a reattempt to obtain a speed sufficient to provide water extraction, during which time the laundry is tumbled for redistribution.

One circuit construction of the invention includes a plurality of switches. One of these switches is operated by the timer of the laundry appliance to control operation of the spin control circuit during the laundry interval calling for spin operation. A second of these switches is an unbalance switch which operates in response to a predetermined amount of unbalance of the rotating drum. A third switch is a speed responsive switch and operates above zero r.p.m. to indicate rotation of the drum and a fourth switch is a speed responsive switch which operates at a predetermined r.p.m. The plurality of switches are connected to control the condition of a plurality of bistable devices including a series of flip-flop circuits, a time delay circuit, and a plurality of gate circuits, the combinational outputs of the bistable circuits being utilized to control the rotation of the drum.

It is, therefore, an object of the invention to provide a simple, inexpensive spin control apparatus for a laundry appliance which eliminates the need for complex mechanical counterbalancing mechanisms used in the part.

It is an object of the invention to provide a spin control apparatus for a laundry appliance which assures that the fluid extraction portion of a washing cycle will be carried out at a speed above a predetermined minimum and at a speed which is dependent upon and continuously adjusted in accordance with the unbalance of the load.

It is another object of the invention to provide an improved control circuit which utilizes digital input information, thereby allowing simple level sensitive devices including switches to be used for sensing as opposed to more complex analog sensors and their associated circuitry.

BRIEF DESCRIPTION OF THE DRAWINGS

Other objects, features and advantages of the invention, its organization, construction and operation will be best understood from the following detailed description taken in conjunction with the accompanying drawings, in which.

DESCRIPTION OF THE PREFERRED EMBODIMENTS

Figure 1:
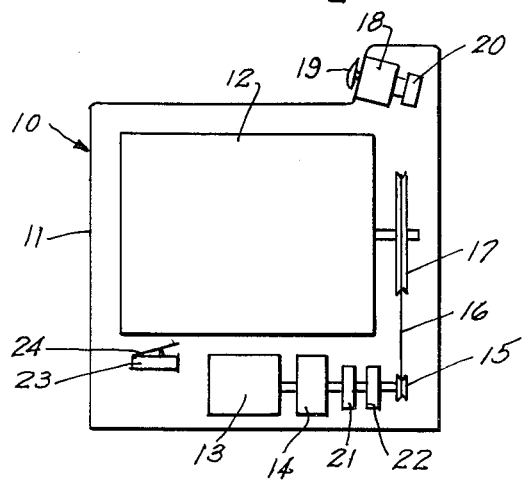
FIG. 1 is a diagrammatic side elevational view of a laundry appliance constructed in accordance with the principles of the present invention.

Referring to FIG. 1, a horizontal axis type washer-dryer is generally illustrated at 10 as comprising a cabinet 11 having a drum 12 rotatably mounted therein. A motor 13 is provided to rotate the drum 12 by way of a transmission 14 having an output pulley 15 which is connected by means of a drive belt 16 to a pulley 17 which is mounted for mutual rotation with the drum 12.

The laundry apparatus is provided with a console-mounted timer 18 having a manually operable controller 19. A spin control computer 20 is provided and may be mounted adjacent to or affixed to the timer 18.

A plurality of switches for detecting drum speed and drum unbalance are provided for the machine of FIG. 1. Other sensing means, such as a tachometer to sense speed, may be employed but switches are simpler and more economical. A first of these switches, referenced 21, is associated with the output shaft of the transmission 14 and is operated at a predetermined speed, for example 250 r.p.m. A second switch 22 is associated with the output shaft of the transmission 14 and is operated to indicate speeds above zero r.p.m. An unbalance switch 23 is mounted with its unbalance sensing arm 24 adjacent the drum 12. The unbalance switch operates when the unbalance of the drum becomes excessive. Each of the switches 21, 22 and 23 are connected to and provide digital inputs for the spin control computer 20.

Figure 2:
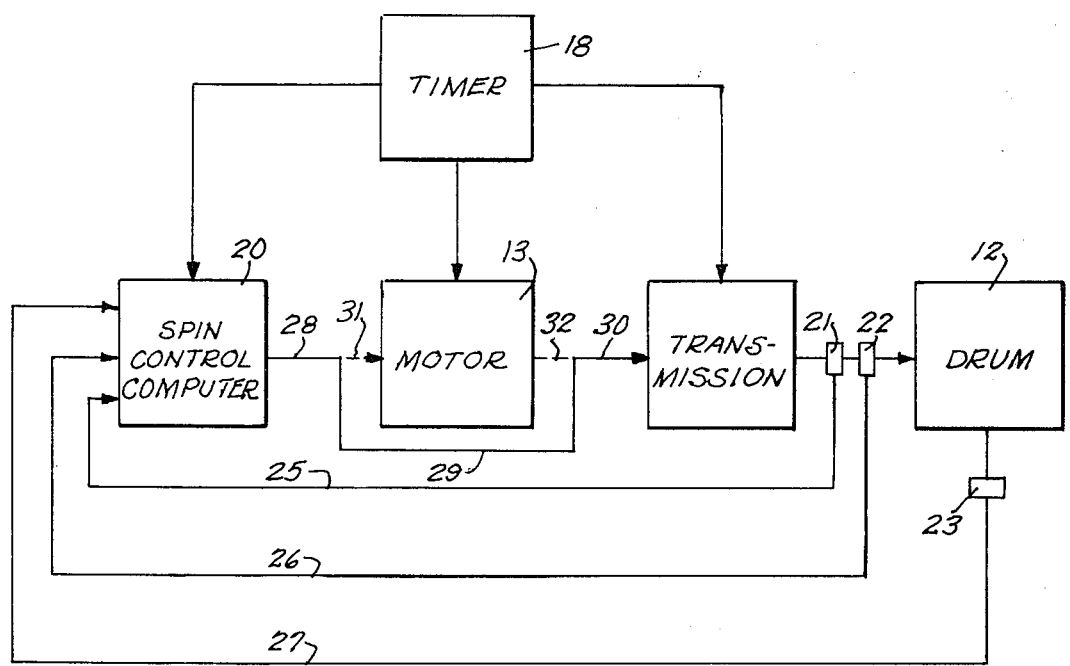
FIG. 2 is a block diagram of a spin control circuit according to the present invention.

Referring to FIG. 2, a block diagram is provided to illustrate the association of the various machine components of the laundry apparatus of FIG. 1. A timer 18 is provided with a plurality of outputs for controlling the operation of the motor 13 and the transmission 14 as is well known in the art. The timer 18 is also provided with an additional output for controlling the spin operation of the motor during a prescribed time of a laundry cycle by way of the spin control computer 20. The rotary output of the transmission is utilized to drive the drum 12 and is sensed by a pair of switches 21 and 22 to provide digital inputs to the spin control computer 20 by way of connections 25 and 26, respectively. The unbalance sensing switch 23 is disposed adjacent the drum 12 and provides digital input signals by way of connection 27 to the spin control computer 20. The spin control computer 20 provides, for the type of machine illustrated in FIG. 1, an output by way of connections 28, 29 and 30 for controlling the transmission 14 for different speeds and braking for the drum 12.

The spin control computer 20 may also provide, at its output 28, input signals for a control input 31 of the motor circuit 13. The motor circuit 13 may be provided to include electronic firing control circuits such as disclosed by B. J. Crane et al. in their United States Patent 3,369,381, assigned to the same assignee as the present invention, which motor circuit would be adapted to receive the output signals of the spin control computer 20 and provide the different speeds and braking at its output 32. Further, if the circuits of the aforementioned patent were used, the transmission 14 would be replaced by a direct motor drive to the drum 12.

Figures 3, 4:
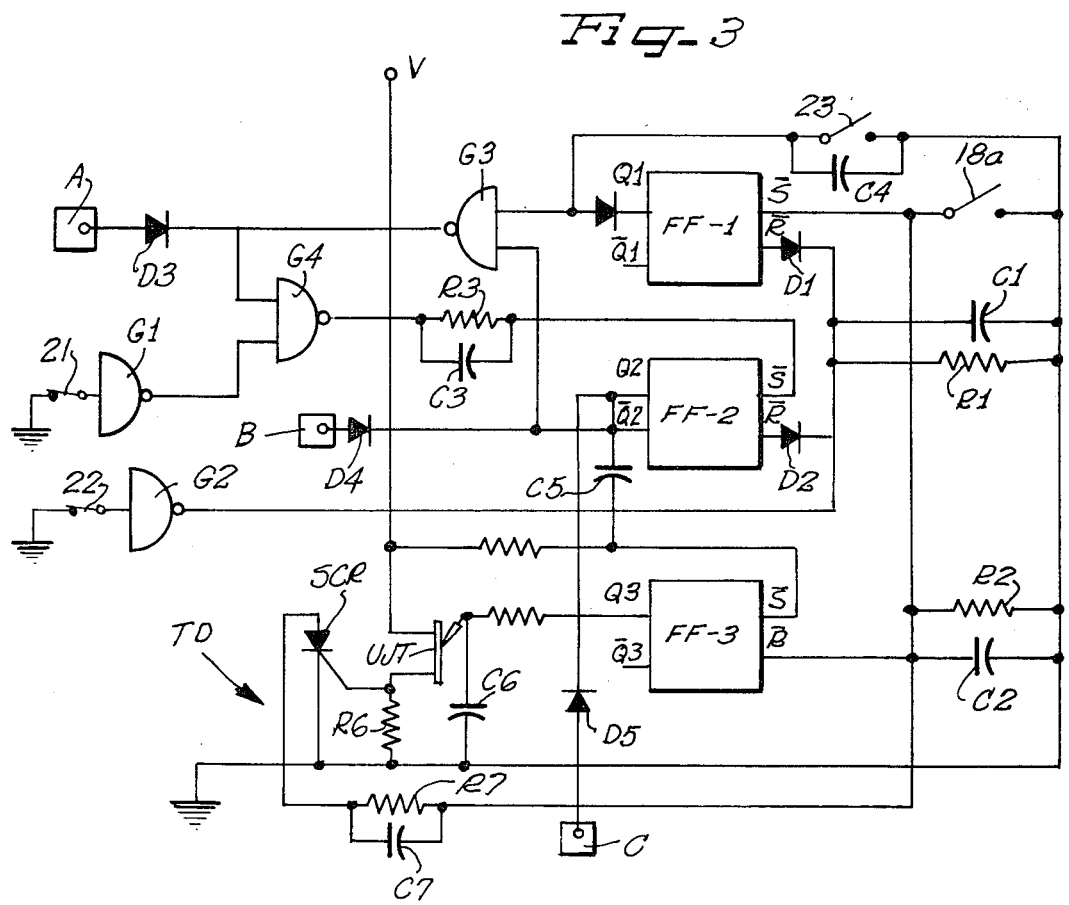
FIG. 3 is a schematic circuit representation of a spin control computer circuit and its associated controlling and controlled elements.
FIG. 4 is a truth table for the computer spin control circuit illustrated in FIG. 3.

Referring now to FIGS. 3 and 4, the spin computer circuit is described in greater detail. The circuit 20 comprises a plurality of NAND gates and RS flip-flop circuits, the logic family of which in this particular design is such that a binary 0 or a low level is at ground potential. Of course, other suitable logic families and corresponding logic levels could be employed in practicing the present invention.

Moreover, although flip-flops are employed in the illustrated embodiment, other types of bistable information storage devices may be used.

As control inputs, the spin computer 20 has a plurality of switches 18a, 21, 22 and 23. The switch 18a is a timer operated switch and is closed to provide the spin command at the appropriate time in a laundry program. The switch 18a connects ground potential to the $\overline{S}$ input of a flip-flop FF-1. The switch 23 is, as mentioned above, an unbalance responsive switch which is normally open and which is repetitively closed by the rotating drum when in an unbalanced condition. The switch 23 provides a low or ground potential to one input of a gate G3. The switch 21 is a normally closed speed responsive switch which operates to its open condition in response to the attainment of a predetermined drum speed, for example 250 r.p.m. The switch 21 connects and disconnects low or ground potential to an inverter gate G1 which has its inverted output connected to one input of a gate G4. The other input of the gate G4 is connected to the output of the gate G3. The switch 22 is a speed responsive switch that is operated to open as the drum stops rotating and reaches a speed of 0 r.p.m. The switch 22 connects and disconnects low or ground potential to an inverter gate G2 whose output is connected to the $\overline{R}$ inputs of the flip-flops FF-1 and FF-2 by way of diode D1 and D2, respectively.

As controlled elements, the spin control computer is effective to operate devices A, B and C which represents conventional speed control and braking solenoids which are associated with the transmission 14. It can be considered that there are actually only two outputs of the speed control computer 20 in that the outputs Q2 and $\overline{Q2}$ for the elements B and C are complementary outputs. In a system such as disclosed in the above Crane et al. Patent 3,369,381, the outputs of the spin control computer would be connected in appropriate polarity sense to the spin and brake firing circuits.

The flip-flop circuit FF-2 includes an output connection by way of a capacitor C5 from its output Q2 to the input $\overline{S}$ of the flip-flop FF-3. The flip-flop FF-3 is employed to initiate operation of a time delay circuit TD which includes a unijunction transistor UJT and a silicon controlled rectifier SCR. A resistor R5 and a capacitor C6 are connected in circuit with the output Q3 of the flip-flop FF-3 and the emitter of the unijunction transistor UJT to provide a delay interval. A suitable potential V is connected to one base of the unijunction transistor while the other base thereof is connected to ground by way of a resistor R6. The second-mentioned base of the unijunction transistor is further connected to the gate electrode of the silicon controlled rectifier SCR which has its cathode connected to ground and its anode connected to the $\overline{R}$ input of the flip-flop FF-3 and the $\overline{S}$ input of the flip-flop FF-1 by way of a parallel connected resistor-capacitor combination R7, C7.

Upon the initial application of power to the circuit, but before the closure of the timer contact 18a, the parallel capacitor-resistor combinations C1, R1 and C2, R2 provide pulses to insure the reset condition of the flip-flops FF-1, FF-2 and FF-3. The timer and other control components of the laundry apparatus function to provide other motor controlled operations, such as agitation and tumbling. For example, upon the application of power to the motor by way of other circuits, the drum may be made to tumble the laundry therein starting from a zero speed and to slowly speed up due to the provision of a soft start circuit. The output of the gate G2 is initially low and the flip-flops are reset so that the outputs Q1, Q2 and Q3 are low. The output of the gate G3 is high since no spin command has been given by way of the contact 18a. The output $\overline{Q2}$ is high so that the run interlock control to element B is off. Since the output Q2 is low, the brake control to the element C is off. The machine operates in a tumbling mode and the output of the gate G2 becomes high as the drum operates above 0 r.p.m.; however, this has no effect on the flip-flops FF-1 and FF-2. Therefore, no further change takes place even during an extended period of tumbling.

Upon momentary closure of the switch 18a, the timer is calling for a high speed spin operation. The connection of ground potential by way of the switch 18a to the $\overline{S}$ input of the flip-flop FF-1 causes its output Q1 to go high, which in turn causes the output of the gate G3 to go low and, accordingly, provide to the element or solenoid A associated with the transmission 14 a high speed spin command.

With the conditions just stated and assuming that the drum 12 is in a condition of excessive unbalance, relative to the predetermined acceptable level, the drum 12 closes the unbalance switch 23 before the drum speed reaches a predetermined value (at which time the gate G1 would go low). Therefore, the ground potential applied to the gate G3 by way of the switch 23 causes the output of the gate G3 to be high which nullifies or interrupts the spin command to the solenoid A. Also, the high output of the gate G3 is a high input to the gate G4 which then goes low at its output and effects a pulse by way of the resistor R3 and the capacitor C3 to the $\overline{S}$ input of the flip-flop FF-2. The flip-flop FF-2 sets so that its output Q2 goes high and the solenoid C is provided with a brake signal. At the same time, the output $\overline{Q2}$ goes low and the "run" power is interrupted by way of the element B. As mentioned above, the outputs to the elements B and C are complementary and may not both be necessary. With the output $\overline{Q2}$ being low, the gate G3 is conditioned to have its output high even though the unbalance switch 23 will open again.

The brake is operable to remain applied until the drum speed has reached 0 at which time the switch 22 opens to provide a low output for the gate G2 to reset the flip-flops FF-1 and FF-2. At this time the machine returns to a tumbling operation.

The provision of the low output at the Q2 output of the flip-flop FF-2 removes the brake command and holds off the braking provided by the solenoid C. Further, the resetting of the flip-flop FF-2 effects a setting of the flip-flop FF-3 by way of the capacitor C5.

The setting of the flip-flop FF-3 provides a high Q3 output. This high output is applied to a resistor-capacitor charging circuit R5, C6 to attain 5–10 seconds of tumbling to seek a new redistribution. After the prescribed timing interval of the RC circuit, the capacitor C6 has charged sufficiently to fire the unijunction transistor UJT and develop a gating pulse across the resistor R6 to cause conduction of the silicon controlled rectifier SCR. Conduction of the silicon controlled rectifier SCR provides a reset pulse to the $\overline{R}$ input of the flip-flop FF–3 and a set pulse to the $\overline{S}$ input of the flip-flop FF–1. Therefore, the output Q3 of the flip-flop FF–3 goes low and the output Q1 of the flip-flop FF–1 goes high causing the output of the gate G3 to go low and provide a spin signal once again to the solenoid A.

The foregoing is repetitive upon each re-application of a spin signal from the gate G3 when the unbalance switch 23 operates before the operation of the switch 21, that is, before the drum reaches a predetermined number of revolutions per minute.

Assuming that the unbalance of the drum 12 is minor, the drum will attain the predetermined speed before the operation of the unbalance switch 23. As the drum reaches the predetermined speed, the switch 21 opens to provide a high input to the inverter gate G1, which in turn provides a low output as an input to the gate G4. The unbalance of the drum 12 will cause the unbalance switch 23 to operate twice each revolution. Each time the output of the gate G3 goes high, the spin signal to the solenoid A will be interrupted, and the faster the drum turns, the longer will be the "power off" condition, so that the final speed hovers around the speed at which the switch 23 periodically trips. The spin speed therefore depends upon the residual unbalance of the load and may be anywhere in a speed range above the predetermined speed, for example, from 250–500 r.p.m.

It should be noted that as the extraction process proceeds, the amount of load unbalance may change due to differences in the amount of water retained by various fabrics in the load being centrifuged. Such changes will be reflected in the tripping of switch 23, and therefore the speed of the drum will be adjusted accordingly.

In summary, there has been disclosed herein a laundry appliance which employs a spin control system which requires no additional counterbalancing means such as have been employed heretofore to obtain a satisfactory spin speed. The unbalanced laundry load is redistributed and a spin is attempted repetitively until a satisfactory spin is obtained. The invention utilizes digital logic and employs simple switch type inputs. It is only necessary to sense a threshold or particular level of the desired system parameter. Therefore, very little signal processing is necessary and amplification and signal shaping are substantially obviated. The invention may be employed in connection with conventional washers or washer-dryers, or may be employed with electronically controlled direct drive automatic laundry systems and will substantially enhance the spin performance of both conventional and electronic systems.

While the invention has been described by reference to specific illustrative embodiments thereof, many changes and modifications may become readily apparent to those skilled in the art without departing from the spirit and scope of the invention, and it is to be understood that I intend to include within the patent warranted hereon all such changes and modifications as may reasonably and properly be included within the scope of my contribution to the art.

The embodiments of the invention in which an exclusive property or privilege is claimed are defined as follows:

1. In a laundry appliance having a rotating system including a drum and drive means for rotating said drum, spin control apparatus comprising: first sensing means associated with said drum for sensing a predetermined unbalance condition; second sensing means associated with said rotating system for sensing a predetermined speed of rotation of said drum; and control circuit means for controlling the speed of said drive means, said circuit means connected to said first and second sensing means and to said drive means, and operative in response to a first sensed condition to effect low speed rotation of said drum for a predetermined period and operative in response to a second sensed condition to effect high speed rotation of said drum at a speed which is dependent upon the amount of unbalance sensed by said first sensing means.

2. A laundry appliance as defined in claim 1 wherein said first and second sensing means comprise first and second switches.

3. A laundry appliance as defined in claim 2 including speed control means operatively connected to said control circuit means for effecting speed changes of said drum, and brake means operatively connected to said control circuit means for braking said drum.

4. A laundry appliance as defined in claim 3, further including a third switch associated with said rotating system and connected to said control circuit means, said switch operable in response to zero drum speed, and said control circuit including means for releasing said brake means in response to operation of said third switch.

5. In a laundry appliance having a rotating system including a drum and drive means for rotating said drum, a control apparatus for said drive means comprising: first sensing means associated with said drum for sensing a predetermined amount of unbalance; second sensing means associated with said rotating system for sensing a predetermined speed of rotation of said drum; a digital information storage circuit connected to said first and second sensing means and having a plurality of distinct states which are determined by the information received from said first and second sensing means, each of said states corresponding to a predetermined operational mode of said appliance; a timing circuit connected to said information storage circuit and responsive to the state thereof to alter the state of said information storage circuit after a predetermined period; and a plurality of control elements associated with said drive means, said elements being connected to said information storage circuitry and operative in response to the state thereof to control the mode of operation of said drive means.

6. In a laundry appliance having a rotatable drum, a digital control circuit for controlling high and low speed running operations and braking operations of a rotational system having motor means driving the drum, said digital control circuit comprising: a first switch associated with the drum and operated thereby upon a condition of excessive rotational unbalance of the drum; a second switch associated with the rotational system and operated thereby in response to a predetermined speed; and circuit means electrically connected between said first and second switch means and said rotational system and responsive to the operational state of said switches to effect braking of said rotational system in response to drum unbalance below said predetermined speed and to effect high speed running operation in response to drum unbalance above said predetermined speed.

7. In a laundry appliance according to claim 6, said digital control circuit comprising third switch means associated with said rotational system and operated thereby at zero revolutions per minute and delay means in said circuit means responsive to the operation of said third switch means to effect low speed running operation for a time interval.

8. In a laundry appliance according to claim 6, wherein said circuit means includes a first gate having an output and a pair of inputs one of which is connected to and controlled by said first switch means, a second gate having an output and a pair of inputs one of which is connected to the output of said first gate and the output of said first gate also connected to the rotational system for controlling the high speed operation thereof, a bistable device connected to and controlled by the output of said second gate and connected to the other input of said first gate, said second switching means connected to the other input of said second gate for controlling the state thereof in conjunction with the output of said first gate and the operational state of said first switch means.

9. In a laundry appliance according to claim 6, wherein said circuit means comprises a first bistable device, a first gate circuit connected to and operated by said first switch means and said first bistable device, and a second gate circuit connected to and operated by said second switching means and said first gate circuit, said second gate circuit further connected to operate said first bistable device and said first bistable device connected to said rotational system for controlling the braking operation thereof.

10. In a laundry appliance according to claim 9, wherein said circuit means comprises a second bistable circuit and a third bistable circuit, said second bistable circuit interposed between said first bistable circuit and said delay means to operate said delay means in response to the operation of said first bistable circuit, and said third bistable circuit interposed between said delay means and said one input of said first gate circuit to control the state of said first gate circuit to provide a high speed running operation of said rotational system after said time interval.

11. A method of operating an automatic laundry apparatus having a drum to attain certifuging speed of the drum, comprising the steps of: rotating the drum at tumbling speed for tumbling the clothes load; rotationally accelerating the drum toward a centrifuging speed while continuously sensing speed and unbalance conditions of the drum; and, limiting and continuously adjusting the centrifuging speed of the drum in accordance with the amount of unbalance sensed.

12. A method of operating an automatic laundry apparatus having a drum to attain centrifuging speed of the drum, comprising the steps of: (1) rotationally driving the drum at tumbling speed for tumbling the clothes load; (2) accelerating the drum toward a centrifuging speed while continuously sensing speed and unbalance conditions of the drum; (3) decelerating the drum to tumbling speed in response to a first set of speed and unbalance conditions indicative of a predetermined unbalance below a predetermined speed; (4) rotating the drum at tumbling speed for tumbling the drum for a predetermined period; (5) accelerating the drum toward centrifuging speed while continuously sensing speed and unbalance conditions of the drum; and (6) in response to a second set of speed and unbalance conditions indicative of the absence of said predetermined unbalance below said predetermined speed, limiting and continuously adjusting the centrifuging speed of the drum in accordance with the amount of unbalance sensed.

13. The method of claim 12, wherein steps 3, 4 and 5 are repeated in sequence until said second set of speed and unbalance conditions are sensed.

References Cited
UNITED STATES PATENTS

| | | | |
|---|---|---|---|
| 3,152,462 | 10/1964 | Elliott et al. | 68—12 R |
| 3,268,791 | 8/1966 | Burns et al. | 210—144 X |
| 3,499,534 | 3/1970 | Holzer | 210—144 |

WILLIAM I. PRICE, Primary Examiner

U.S. Cl. X.R.

68—12 R, 23.1; 210—144